Jan. 31, 1956  J. B. GILL  2,733,080
SAND ELIMINATOR BEARING FOR A SPRINKLER HEAD
Filed Jan. 13, 1953

INVENTOR.
John B. Gill
BY
A. Schapp
ATTORNEY

United States Patent Office 2,733,080
Patented Jan. 31, 1956

2,733,080
SAND ELIMINATOR BEARING FOR A SPRINKLER HEAD

John B. Gill, San Francisco, Calif.

Application January 13, 1953, Serial No. 331,015

2 Claims. (Cl. 285—97.8)

The present invention relates to improvements in a sand eliminator bearing for a sprinkler head used in sprinkling and irrigating systems, and its principal object is to provide a bearing of the character described in which sand and foreign matter are prevented from entering between the bearing surfaces of a fixed housing and a rotary spindle carrying the sprinkler head.

In systems used heretofore, it has been customary to allow for a certain amount of leakage through the bearings and to cause the leakage to serve as a lubricant for the bearings. I have found, however, that the leakage always carries a certain amount of sand and foreign matter which tends to abrade the bearing surfaces and to shorten the life of the bearings.

In the present invention, it is proposed to provide a bearing structure employing anti-friction bearings which do not depend upon a lubricant for successful operation, to reduce the leakage about the spindle to minimum, and to divert the leakage into the atmosphere before it reaches the bearings.

Further objects and advantages of my invention will appear as the specification proceeds, and the novel features of my bearing will be fully defined in the claims attached hereto.

Figures 1, 2:
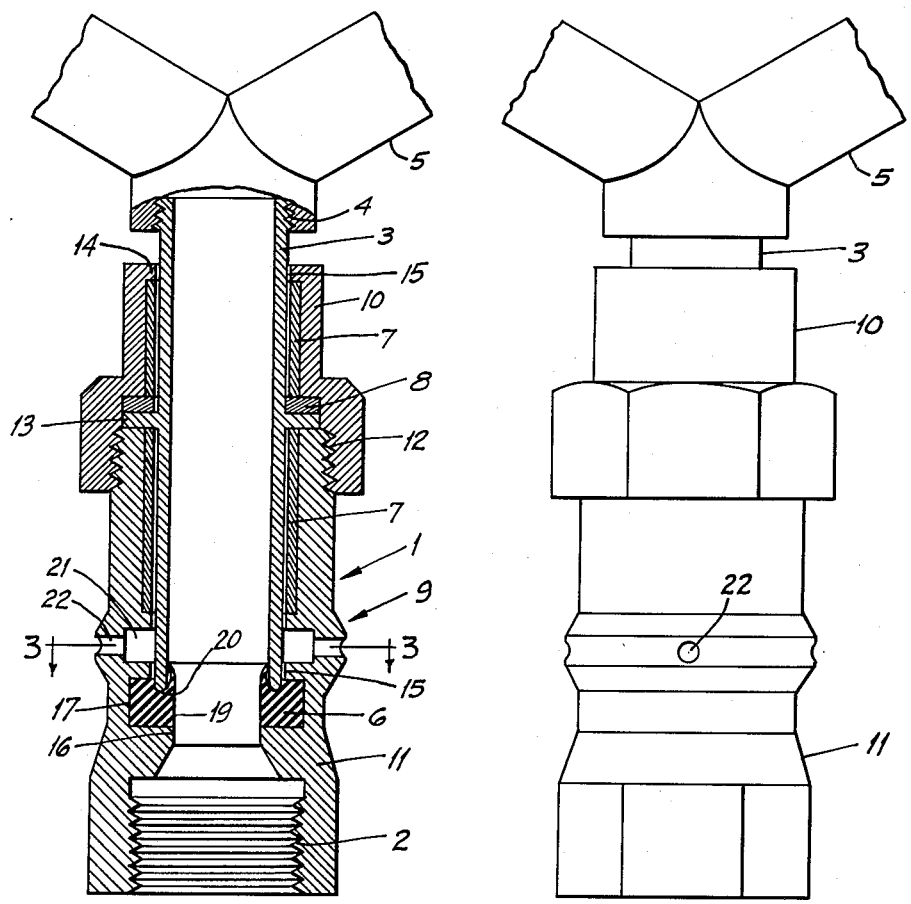
Figure 3:
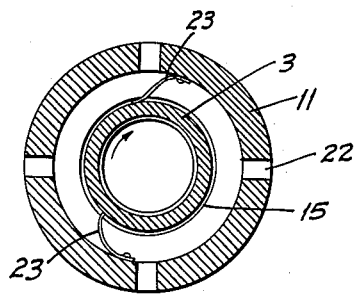

The preferred form of the invention is illustrated in the accompanying drawing, forming part of this application, in which:

Figure 1 shows a vertical section through my bearing;
Figure 2, a side elevation thereof; and
Figure 3, a horizontal section taken along line 3—3 of Figure 1.

While I have shown only the preferred form of my invention, I wish to have it understood that various changes or modifications may be made within the scope of the claims hereto attached without departing from the spirit of the invention.

Referring to the drawing in detail, my bearing comprises in its principal parts, a cylindrical or tubular housing 1 threaded at its lower end, as at 2, for attachment to the riser of an irrigating system, a hollow spindle 3 revolvable in the housing, and threaded at its upper end, as at 4, for connection to a sprinkler head 5, a sealing ring 6 at the bottom end of the spindle, lateral or radial bearings 7 between the housing and the spindle, an anti-thrust bearing 8 and means shown at 9 between the sealing ring and the bearing for relieving pressure or leakage passing through the sealing ring and for diverting the leakage to the atmosphere.

The cylindrical housing is preferably made in two sections 10 and 11, the former being threaded upon the latter, as at 12, and the body portions of the sections providing an intervening space for accommodating a flange 13 projecting from the spindle and the anti-thrust bearing 8, which is made of graphite, or similar anti-friction material.

The radial or lateral bearing 7, one below and one above the anti-thrust bearing, are arranged in the upper part of the housing, and the upper bearing is held in place by an inwardly projecting flange 14. These bearings are also made of graphite or any suitable anti-friction material.

Generally, the bore of the cylindrical housing, where it immediately faces the spindle, is of a diameter slightly larger than the outer diameter of the spindle to leave a slight annular clearance, as at 15.

While the radial bearing 7 is shown in two sections, it is apparent that a unitary bearing may be substituted, with the anti-thrust bearing disposed either above or below.

The lower end of the housing has a restricted bore 16 of a diameter slightly smaller than that of the spindle and is formed, below the spindle, with an annular groove 17, in which is mounted the sealing ring 6 made of rubber or similar material, the groove being machined and the sealing ring being tightly fitted in the groove.

The inner wall 19 of the sealing ring is made to come flush with the inner bore 16 of the housing and to project inwardly slightly beyond the inner face of the spindle.

In the upper surface of the sealing ring I provide an annular groove 20 commensurate with the spindle and adapted to receive the lower end of the spindle which is revolvable in the groove. The inner wall of the groove thus extends into the spindle, forming a feathered edge or lip against the same and reducing any leakage about the lower end of the spindle to a minimum.

The feathered edge or lip is preferably somewhat higher than the outer wall of the groove, and is made to curve away from the spindle in its middle portion, to achieve, as near as possible, a line contact between the extremity of the edge and the spindle.

But, a small amount of leakage will occur, carrying sand and other foreign matter, and in order to prevent the leakage from reaching the bearings, I provide the relief means shown at 9, and comprising an annular groove 21 in the housing facing the spindle and disposed a short distance above the sealing ring and below the bearings, and one or more outlet ports 22 connecting with the groove.

This arrangement relieves all pressure and allows the leakage to discharge into the atmosphere.

As an auxiliary means for removing any solids carried by the leakage from the surface of the spindle, I may provide one or more wipers 23 of suitable shape and preferably made of bronze, to scrape the surface of the spindle opposite the groove and to direct the solids toward the ports.

In operation, it will be readily understood that, when water is forced through the bearing under pressure and causes the sprinkler head and the spindle to rotate, the sealing ring at the bottom of the spindle will tend to reduce leakage to a minimum, and that what little leakage does occur, will be diverted through the groove 20 and the ports 22 into the atmosphere, without coming in contact with the bearings.

The surface of the spindle is machined to allow the spindle to rotate rather freely in the sealing ring, without too much frictional drag, while at the same time, the lip lying against the inner face of the spindle tends to reduce leakage to a minimum, and is adapted, due to its length, to compensate for a slight rise of the spindle caused by wear on the thrust shoulder 13.

I claim:

1. In a bearing for a sprinkler head, an integral tubular housing section having means at its lower end for securing the same upon a riser and having an annular groove cut thereinto from the inside thereof, a sealing ring mounted in said groove and having its upper face projecting inwardly beyond the portion of the housing wall located above the ring to form a bearing surface, and a spindle revolvable in the housing section and having a bottom face revolvable on said bearing surface, the spindle projecting upwardly above the housing section and having a flange bearing on the top of the section, with a washer disposed above the flange, and a second housing section threaded upon the upper end of the first section and bearing on the washer for holding the spindle against upward movement.

2. In a bearing for a sprinkler head, an integral tubular housing section having means at its lower end for securing the same upon a riser and having an annular groove cut thereinto from the inside thereof, a sealing ring mounted in said groove and having its upper face projecting inwardly beyond the portion of the housing wall located above the ring to form a bearing surface, and a spindle revolvable in the housing section and having a bottom face revolvable on said bearing surface, the spindle projecting upwardly above the housing section and having a flange bearing on the top of the section, with a washer disposed above the flange, and a second housing section threaded upon the upper end of the first section and bearing on the washer for holding the spindle against upward movement, the spindle and the first housing section having a lateral bearing interposed between the same above the sealing ring, and the first housing section having means disposed between the sealing ring and the latter bearing for discharging leakage passing the sealing ring into the atmosphere.

References Cited in the file of this patent

UNITED STATES PATENTS

| | | |
|---|---|---|
| 816,432 | Charky | Mar. 27, 1906 |
| 999,169 | Jones | July 25, 1911 |
| 1,012,398 | McCombie | Dec. 19, 1911 |
| 1,153,824 | Pierce | Sept. 14, 1915 |
| 1,912,494 | Patterson | June 6, 1933 |
| 2,108,787 | Coles et al. | Feb. 22, 1938 |
| 2,485,940 | Tremolada | Oct. 25, 1949 |
| 2,625,411 | Unger | Jan. 13, 1953 |